April 19, 1927.

F. HALL 1,625,024

DUPLEX STRAINER

Filed Dec. 26, 1925

2 Sheets-Sheet 1

INVENTOR
Frederick Hall
BY Charles S. Jones
ATTORNEY

April 19, 1927.
F. HALL
DUPLEX STRAINER
Filed Dec. 26, 1925
1,625,024
2 Sheets-Sheet 2
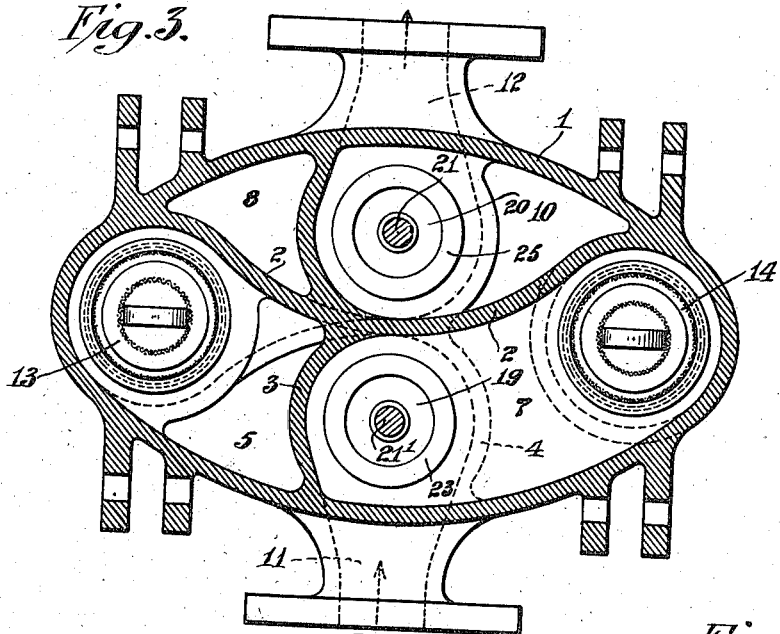
Fig. 3.
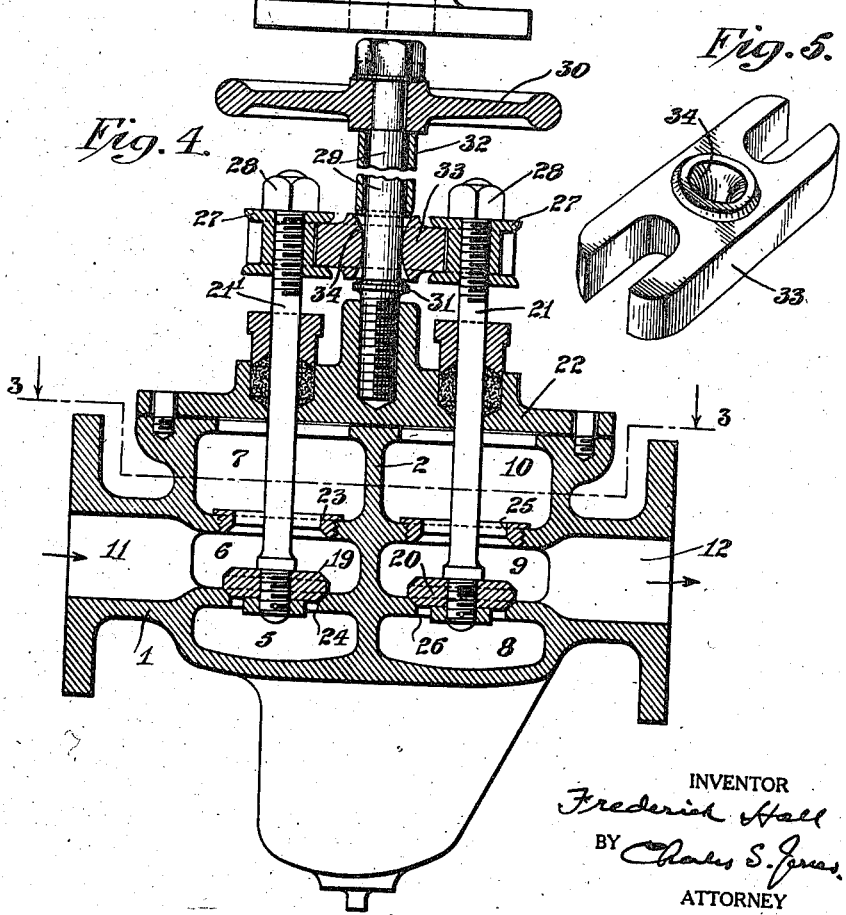
Fig. 4.
Fig. 5.
INVENTOR
Frederick Hall
BY Charles S. Jones
ATTORNEY Patented Apr. 19, 1927.

1,625,024

UNITED STATES PATENT OFFICE.

FREDERICK HALL, OF PLAINFIELD, NEW JERSEY, ASSIGNOR TO BERGGREN ENGINEERING CORPORATION, OF BROOKLYN, NEW YORK, A CORPORATION OF NEW YORK.

DUPLEX STRAINER.

Application filed December 26, 1925. Serial No. 77,692.

Figure 1:
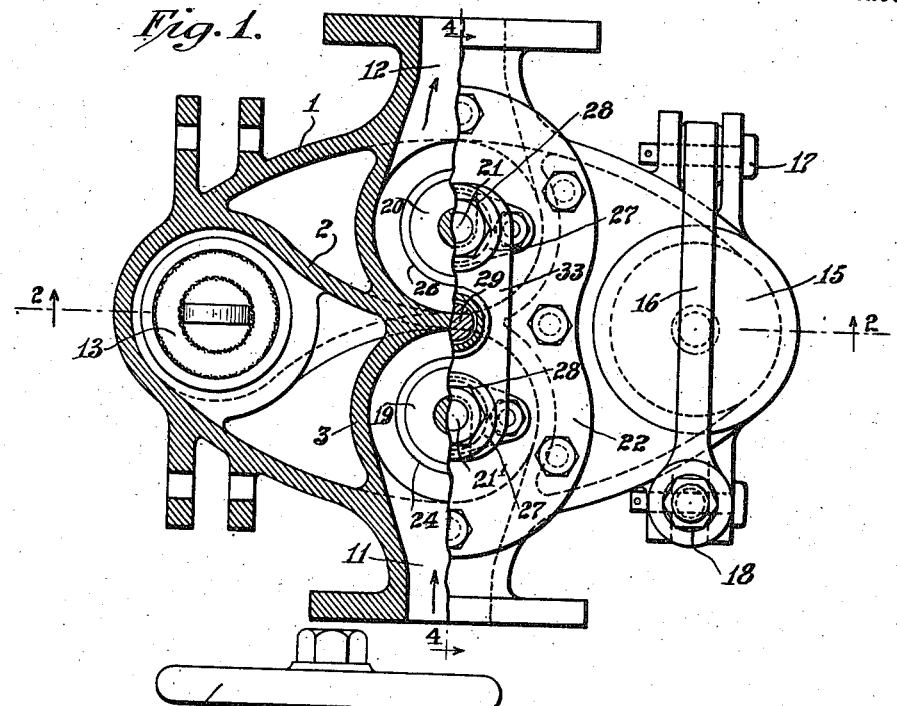
Figure 2:
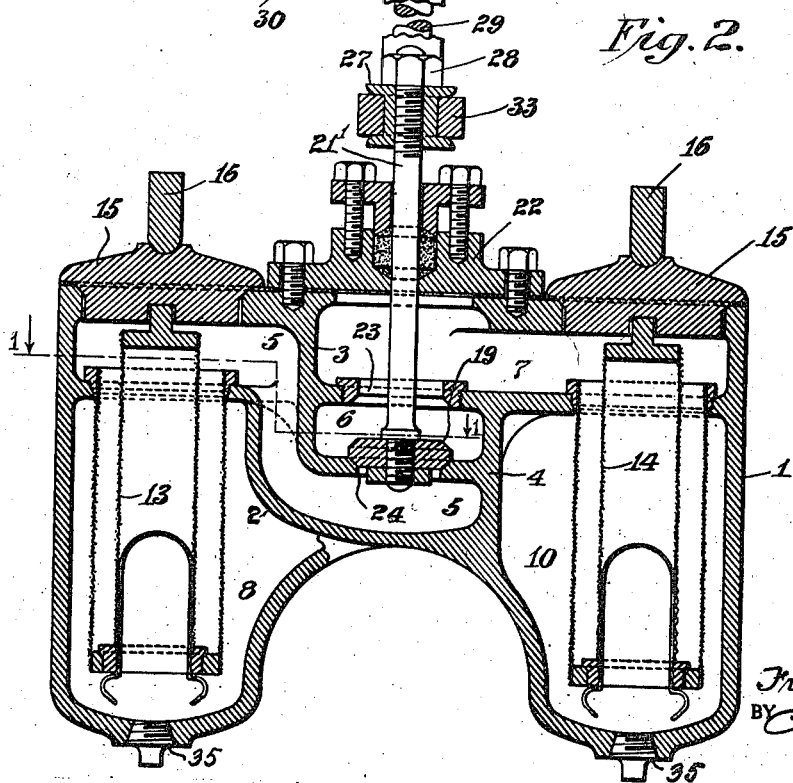

My invention relates to fluid strainers of the duplex type and is adapted for the treatment of oil, water, steam or other fluid carrying foreign matter in suspension, and will be understood by reference to the following specification taken in connection with the accompanying drawings in which Fig. 1 is a part plan and part horizontal section, the section being on the plane of the line 1—1 of Fig. 2; Fig. 2 is a central vertical section on the plane of the line 2—2 of Fig. 1; Fig. 3 is a horizontal section on the plane of the line 3—3 of Fig. 4; Fig. 4 is transverse section on the plane of the line 4—4 of Fig. 1, and Fig. 5 is a perspective view of a detail. Similar reference numerals indicate similar parts in the several views.

Referring to the drawings the numeral 1 designates the body or casing of the strainer the interior of which is divided by ribs 2, 3 and 4 into a plurality of chambers through which the fluid to be treated is caused to flow through one strainer or the other according to the position of the valves to be hereinafter described. The form and relation of these chambers are illustrated in Figures 2 and 4 and for convenience of description I have designated them by the numerals 5 to 10 both inclusive. On one side of the casing is an inlet connection 11 through which the fluid flows into a valve chamber 6, this chamber serving as the inlet for both strainers. On the opposite side of the casing is an outlet connection 12 which receives the discharge from both strainers through the valve chamber 9. The strainers 13 and 14, which are of the double basket type, are suitably supported in the chambers or wells 8 and 10 respectively, both of which chambers extend below the common inlet and outlet connections 11 and 12 respectively. The wells are closed by covers 15 similar in construction, and these are held to their seats on the casing by yokes 16 pivoted at one end upon a bolt or pin 17 and held securely in place by nuts 18. In the common inlet chamber is a valve 19 and in the common outlet chamber 9 is a valve 20. The respective valve stems 21' and 21 pass through suitable stuffing boxes and glands in the cover 22. The chamber 6 is provided with two aligned valve seats 23 and 24 the openings through which communicate respectively with the chambers 7 and 5, and the chamber 9 is provided with aligned valve seats 25 and 26 the openings through which communicate with the chambers 10 and 8 respectively. The position of the valves determines the direction of flow of the fluid through one or the other of the strainers 13 and 14.

To effect the simultaneous movement of the valves 19 and 20 and to insure their proper seating, their stems 21 and 21' are threaded at their upper ends to receive spools 27 which are held thereon by check nuts 28. Threaded into a boss projecting from the upper side of cover 22 is a valve operating stem 29 provided with a handle 30 by which it may be rotated. The stem 29 is formed with a collar 31 and is surrounded immediately below the handle with a thimble 32. Supported upon the collar and between it and thimble 32, the stem 29 carries a floating yoke 33 formed with bifurcated ends, as shown in Fig. 5, which embrace the spools 27. The opening 34 in yoke 33 is so formed that its wall at its center bears against stem 29, and from the center is curved outwardly in both directions. This gives sufficient clearance between stem 29 and the yoke and provides a compensating means to insure proper seating of the valves in both their upper and lower positions.

With the valves in their lower positions, as shown in the drawings, the fluid to be filtered will pass through the basket 14, while the other basket will be by-passed to permit it to be cleaned. In such position of the valves, the fluid enters inlet 11, flows into chamber 6, through the upper valve seat 23 into chamber 7, through the perforations of basket 14 into chamber 10, through upper seat 25 of valve 20, into chamber 9 and then through outlet 12. When the direction of flow is to be through basket 13 and basket 14 is to be by-passed to permit it to be cleaned, both valves are raised simultaneously by turning their common operating stem 29 by means of its handle 30, and seated upon their respective upper seats 23 and 25. The flow of the fluid will now be from inlet 11 to chamber 6, through the lower valve seat to chamber 5, through the perforations of basket 13 into chamber 8, through lower valve seat 26 to chamber 9 and thence to outlet 12. When basket 13 again requires cleaning the valves 19 and 20 will be moved to their lower seats when the course of the fluid will be as first above stated.

From the foregoing description it will be seen that the provision of a single casing divided into complemental sets of chambers or compartments, with a single operating means for the individual valves, makes for a strong, compact and economical structure possessing many advantages over present types in which the baskets are enclosed in individual wells and the valves and their operating mechanism housed in individual chambers attached or secured to the wells. Also the introduction of the floating yoke compensates for the wear on the valves and their seats and insures proper seating of the valves in both positions.

A further advantage may be noted in that the inlet and outlet are in the same plane. This permits of a symmetrical arrangement of the piping and does away with offsets. Also, the outlet being considerably higher than the bottoms of the wells allows the sludge to settle in the wells and to be discharged through the cleaning out plugs 35.

With reference to the operation, it is to be noted that there is no stoppage of the flow at any time while the change is being made from one strainer to the other. When the valves are off their seats the flow is through both wells but is cut off from one of the wells the moment the valves are seated on either their lower or upper seats. This is of particular advantage in oil burning systems in which provision must be made to insure a constant flow of the oil.

What I claim is:

1. A fluid strainer of the duplex type comprising a casing having ribs dividing its interior into a plurality of chambers in two of which strainers are mounted, another of said chambers serving as an inlet to the strainers and another as an outlet from the strainers, said inlet and outlet chambers having aligned upper and lower valve seats, valves in the inlet and outlet chambers, and a common operating means connected to the valve stems for simultaneously seating the valves on either their upper or lower seats to thereby direct the flow of the fluid through one strainer and to by-pass the other.

2. Apparatus of claim 1 having a compensating device to insure proper seating of the valves.

3. Apparatus of claim 1 having a floating yoke surrounding the individual valve stems, for the purpose described.

In testimony, whereof, I have signed my name to this specification this 24th day of December, 1925.

FREDERICK HALL.